(12) United States Patent
Lee

(10) Patent No.: US 12,162,367 B2
(45) Date of Patent: Dec. 10, 2024

(54) METHOD OF CONFIGURING LONGITUDINAL WIRELESS CHARGING CHAIN FOR ELECTRIC VEHICLE AND APPARATUS AND SYSTEM THEREFOR

(71) Applicant: HYUNDAI MOBIS CO., LTD., Seoul (KR)

(72) Inventor: Jae Young Lee, Icheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 244 days.

(21) Appl. No.: 17/864,565

(22) Filed: Jul. 14, 2022

(65) Prior Publication Data
US 2023/0166614 A1    Jun. 1, 2023

(30) Foreign Application Priority Data

Nov. 26, 2021    (KR) .................. 10-2021-0166034

(51) Int. Cl.
| | | |
|---|---|---|
| *B60L 53/36* | (2019.01) | |
| *B60L 53/12* | (2019.01) | |
| *B60L 53/37* | (2019.01) | |
| *B60L 53/38* | (2019.01) | |
| *B60L 53/65* | (2019.01) | |

(Continued)

(52) U.S. Cl.
CPC .............. *B60L 53/36* (2019.02); *B60L 53/12* (2019.02); *B60L 53/37* (2019.02); *B60L 53/38* (2019.02); *B60L 53/65* (2019.02); *G01S 15/08* (2013.01); *G01S 17/08* (2013.01); *G01S 17/86* (2020.01); *G06V 20/58* (2022.01); *H02J 7/342* (2020.01);

(Continued)

(58) Field of Classification Search
CPC ......... B60L 53/36; B60L 53/12; B60L 53/37; B60L 53/38; B60L 53/65; B60L 53/126; B60L 53/66; G01S 15/08; G01S 17/08; G01S 17/86; G06V 20/58; H02J 7/342; H02J 50/10; H02J 50/40; H02J 50/90; H04W 4/40; Y02T 10/70; Y02T 10/7072; Y02T 90/12; Y02T 90/14; Y02T 90/167; B60Y 2200/91

See application file for complete search history.

(56) References Cited

U.S. PATENT DOCUMENTS

| | | | | |
|---|---|---|---|---|
| 2014/0089064 A1* | 3/2014 | Hyde | ..................... | B60L 53/65 |
| | | | | 705/14.4 |
| 2016/0129793 A1* | 5/2016 | Cronie | .................... | H02J 50/90 |
| | | | | 320/109 |

(Continued)

FOREIGN PATENT DOCUMENTS

DE    10 2017 207 926 A1    11/2018

OTHER PUBLICATIONS

Extended European Search Report Issued on Jan. 9, 2023, in counterpart European Patent Application No. 22184029.1 (8 Pages in English).

*Primary Examiner* — Frederick M Brushaber
(74) *Attorney, Agent, or Firm* — NSIP Law

(57) ABSTRACT

A method of configuring a longitudinal wireless charging chain by a first vehicle, includes detecting a second vehicle in which a longitudinal wireless charging chain is configurable; calculating a distance to the second vehicle; performing, based on the calculated distance being within a first distance, lateral alignment with the second vehicle; and performing, based on the calculated distance being within a second distance, longitudinal alignment with the second vehicle.

20 Claims, 9 Drawing Sheets

(51) Int. Cl.
　　　*G01S 15/08*　　　(2006.01)
　　　*G01S 17/08*　　　(2006.01)
　　　*G01S 17/86*　　　(2020.01)
　　　*G06V 20/58*　　　(2022.01)
　　　*H02J 7/34*　　　(2006.01)
　　　*H02J 50/10*　　　(2016.01)
　　　*H02J 50/40*　　　(2016.01)
　　　*H02J 50/90*　　　(2016.01)
　　　*H04W 4/40*　　　(2018.01)

(52) U.S. Cl.
　　　CPC .............. *H02J 50/10* (2016.02); *H02J 50/40* (2016.02); *H02J 50/90* (2016.02); *H04W 4/40* (2018.02)

(56) References Cited

U.S. PATENT DOCUMENTS

| | | |
|---|---|---|
| 2018/0086212 A1 | 3/2018 | Dudar et al. |
| 2019/0135133 A1* | 5/2019 | Miller ..................... B60L 53/34 |
| 2021/0046861 A1* | 2/2021 | Li ......................... G06V 10/30 |
| 2023/0182599 A1* | 6/2023 | Landgraf ................ B60L 53/53 |
| | | 320/109 |

* cited by examiner

FIG.6
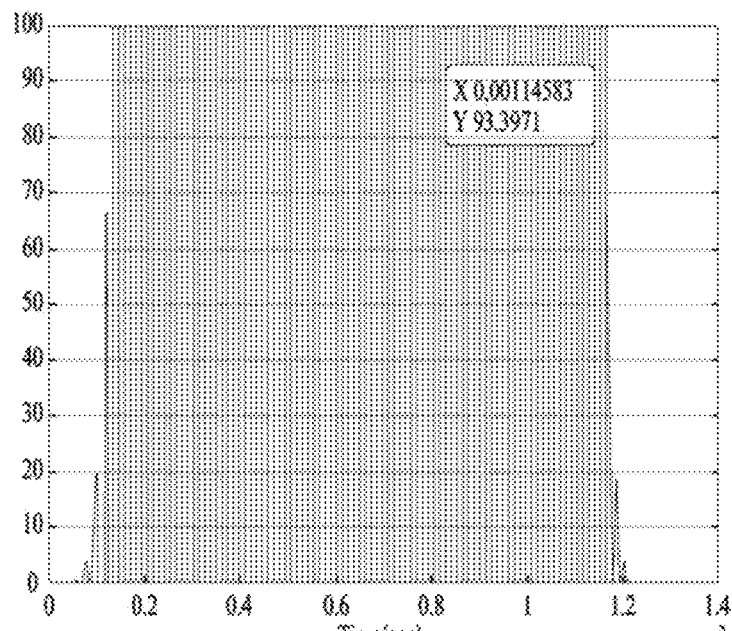
(a) Number of transmission pulses 16 EA
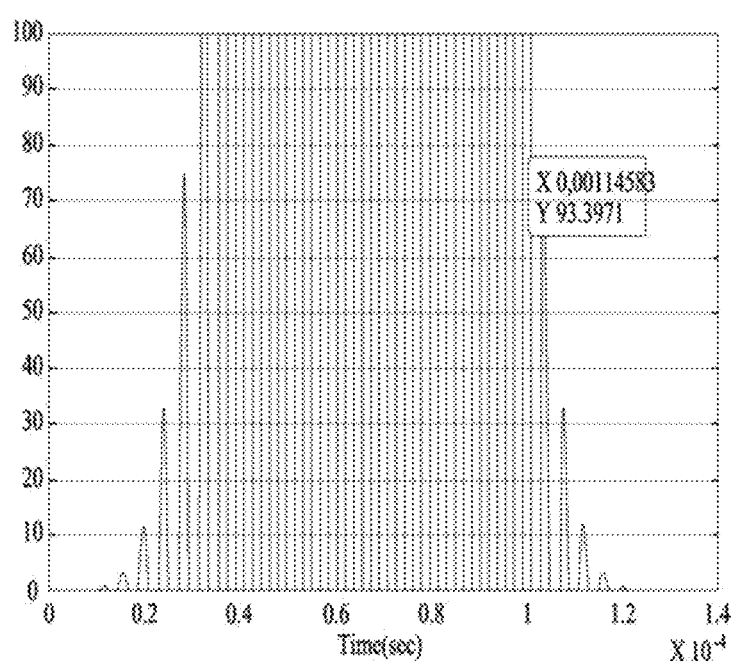
(b) Number of transmission pulses 1 EA

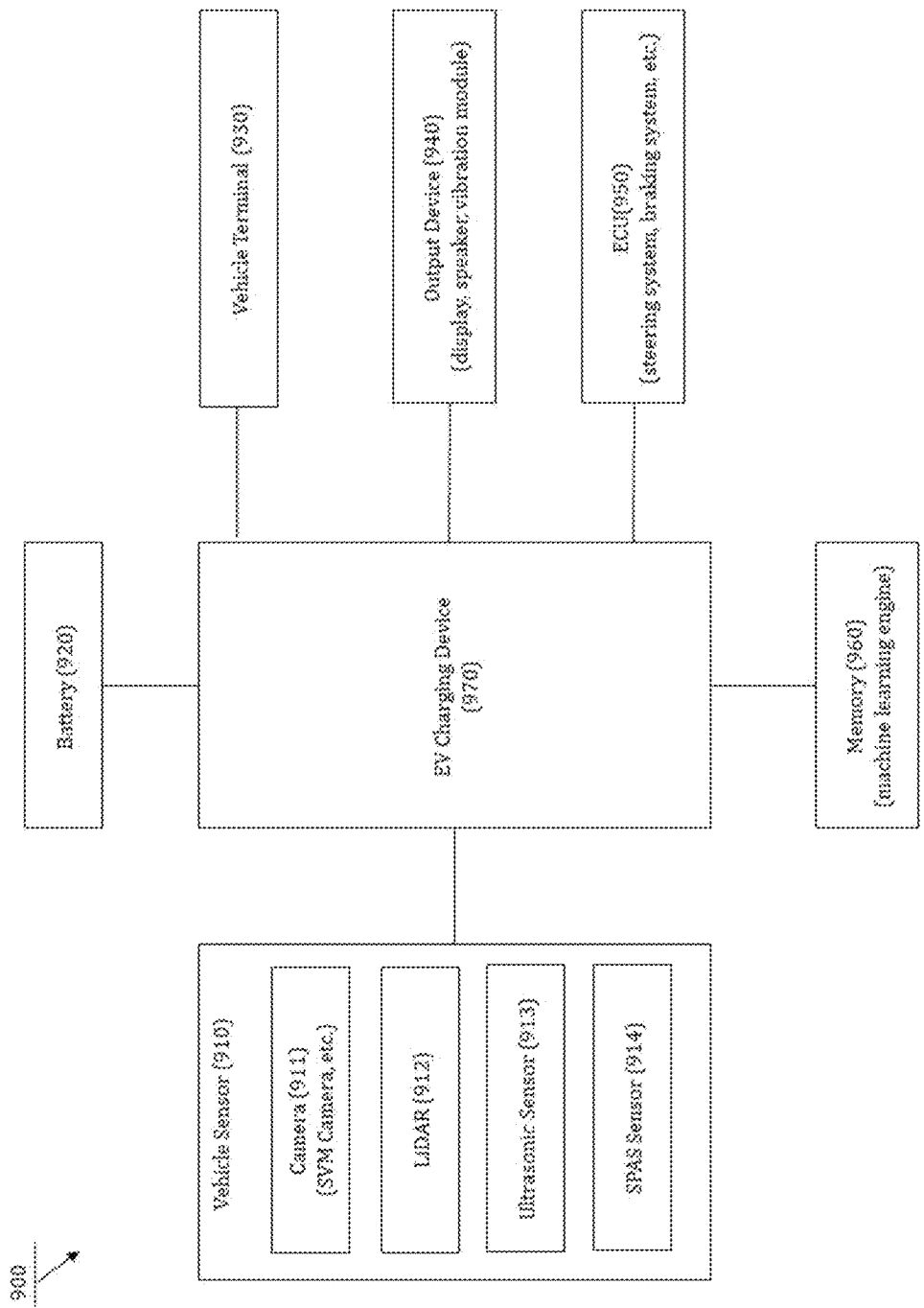

METHOD OF CONFIGURING LONGITUDINAL WIRELESS CHARGING CHAIN FOR ELECTRIC VEHICLE AND APPARATUS AND SYSTEM THEREFOR

CROSS-REFERENCE TO RELATED APPLICATIONS

This application claims the benefit under 35 USC 119(a) of Korean Patent Application No. 10-2021-0166034, filed on Nov. 26, 2021 in the Korean Intellectual Property Office, the entire disclosure of which is incorporated herein by reference for all purposes.

BACKGROUND

1. Field

The present disclosure relates to wireless charging technology for electric vehicles, and more particularly, to a technology for configuring a longitudinal wireless charging chain by aligning electric vehicles equipped with wireless power transmission/reception pads for wireless charging.

2. Discussion of the Related Art

As the spread of electric vehicles is invigorated, interest in electric vehicle charging is increasing. In the current electric vehicle charging system, electric vehicles are charged by connecting a dedicated charging plug provided at a separate charging station or in a house/parking lot to the electric vehicles.

However, charging an electric vehicle takes more time than a general refueling method, and there are difficulties in charging because sufficient charging stations have not been secured.

Accordingly, recently, interest in wireless charging of electric vehicles as an alternative to the existing charging stations is increasing.

According to the method of wireless charging of electric vehicles, when a vehicle equipped with a wireless charging reception pad is placed on a wireless power transmission pad buried in the ground and current is applied to the wireless power transmission pad, electric energy is transmitted to the wireless charging reception pad of the vehicle by inducing magnetic resonance to charge the battery provided in the vehicle.

The wireless charging method for electric vehicles is subjected to spatial restrictions compared to the conventional plug-based charging method.

However, in the case of wireless charging of vehicles waiting for a signal at an intersection, wireless power transmission pads as many as the number of electric vehicles waiting for a signal at the intersection are required to be buried in the road.

In particular, since the number of required wireless power transmission pads varies according to a change in traffic volume over time, it is difficult to efficiently manage the transmission pads.

Further, when many wireless power transmission pads are buried in the road, maintenance of the transmission pads is not easy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of configuring a longitudinal wireless charging chain by a first vehicle, includes detecting a second vehicle in which a longitudinal wireless charging chain is configurable; calculating a distance to the second vehicle; performing, based on the calculated distance being within a first distance, lateral alignment with the second vehicle; and performing, based on the calculated distance being within a second distance, longitudinal alignment with the second vehicle.

The distance to the second vehicle may be calculated using either one or both of an ultrasonic sensor and a Light Detection and Ranging (LiDAR) provided in the first vehicle.

The second vehicle is detected through Vehicle to Everything (V2X) communication.

The performing of the lateral alignment with the second vehicle may include classifying objects through pixel analysis of an image captured by a camera, calculating an average lateral position of pixels corresponding to a classified specific object of the classified objects, and performing lateral steering control by comparing the average lateral position with ½ of lateral pixels of the image.

The classified specific object may be a license plate of the second vehicle.

The classified specific object may be dynamically determined based on a vehicle type of the second vehicle.

The camera may be a surround view monitor (SVM) front camera.

The performing of the lateral alignment may include performing, based on the average lateral position being greater than ½ of the lateral pixels of the image, steering control of the first vehicle to a first direction; and performing, based on the average lateral position being less than or equal to ½ of the lateral pixels of the image, steering control of the first vehicle to a second direction different from the first direction.

The performing of the longitudinal alignment may include decreasing a number of ultrasonic sensor drive pulses, setting a short-range detection limit distance corresponding to the decreased number of the ultrasonic sensor drive pulses, measuring a ringing time, and performing fine longitudinal alignment up to the short-range detection limit distance based on the measured ringing time.

The number of ultrasonic sensor drive may be is decreased to 1.

In another general aspect, a non-transitory computer-readable storage medium storing instructions that, when executed by one or more processors, configure the one or more processors to perform operations for configuring a longitudinal wireless charging chain by a vehicle operatively connected to another vehicle over a communication network, the operations comprising: detecting the other vehicle in which the longitudinal wireless charging chain is configurable; calculating a distance to the other vehicle; performing, based on the calculated distance being within a distance, lateral alignment with the other vehicle; and performing, based on the calculated distance being within another distance, longitudinal alignment with the other vehicle.

In another general aspect, an electric vehicle configured for wireless charging includes a vehicle terminal configured to communicate with another vehicle; a vehicle sensor including a camera, a Light Detection and Ranging (Li-DAR), and an ultrasonic sensor; and an electric vehicle (EV)

charging device configured to: detect, in operative connection with the vehicle terminal, the other vehicle in which longitudinal wireless charging chain is configurable; calculate a distance to the other vehicle in operative connection with the vehicle sensor; and perform lateral alignment and longitudinal alignment with the other vehicle based on the calculated distance.

The EV charging device may be further configured to: perform, based on the distance to the other vehicle being within a first distance, the lateral alignment; and perform, based on the distance to the other vehicle being within a second distance, the longitudinal alignment. The first distance may be longer than the second distance.

The distance to the other vehicle may be calculated using either one or both of the ultrasonic sensor and the LiDAR. The camera may include a surround view monitor (SVM) front camera.

The other vehicle may be detected through Vehicle to Everything (V2X) communication.

The EV charging device may be further configured to classify objects through pixel analysis of an image captured by the camera, calculate an average lateral position of pixels corresponding to a classified specific object of the classified objects, and perform lateral steering control by comparing the average lateral position with ½ of lateral pixels of the image captured by the camera.

The classified specific object may be a license plate of the other vehicle.

The classified specific object may be dynamically determined based on a vehicle type of the other vehicle.

The EV charging device may be operatively connected to a steering system over an in-vehicle communication network. The EV charging device may be further configured to: perform, based on the average lateral position being greater than ½ of the lateral pixels of the image, steering control to move the vehicle to a first direction with respect to a travel direction; and perform, based on the average lateral position being less than or equal to ½ of the lateral pixels of the image, steering control to move the vehicle to a second direction different from the first direction with respect to the travel direction.

The EV charging device may be further configured to decrease a number of ultrasonic sensor drive pulses for the longitudinal alignment, set a short-range detection limit distance corresponding to the decreased number of the ultrasonic sensor drive pulses, and perform fine longitudinal alignment up to the short-range detection limit distance based on a measured ringing time. The EV charging device may decrease the number of ultrasonic sensor drive pulses to 1.

Other features and aspects will be apparent from the following detailed description, the drawings, and the claims.

BRIEF DESCRIPTION OF THE DRAWINGS

FIG. 6 shows waveforms according to the number of transmission (drive) pulses of an ultrasonic sensor according to an embodiment.

FIG. 9 is a block diagram illustrating a configuration of an electric vehicle according to an embodiment.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
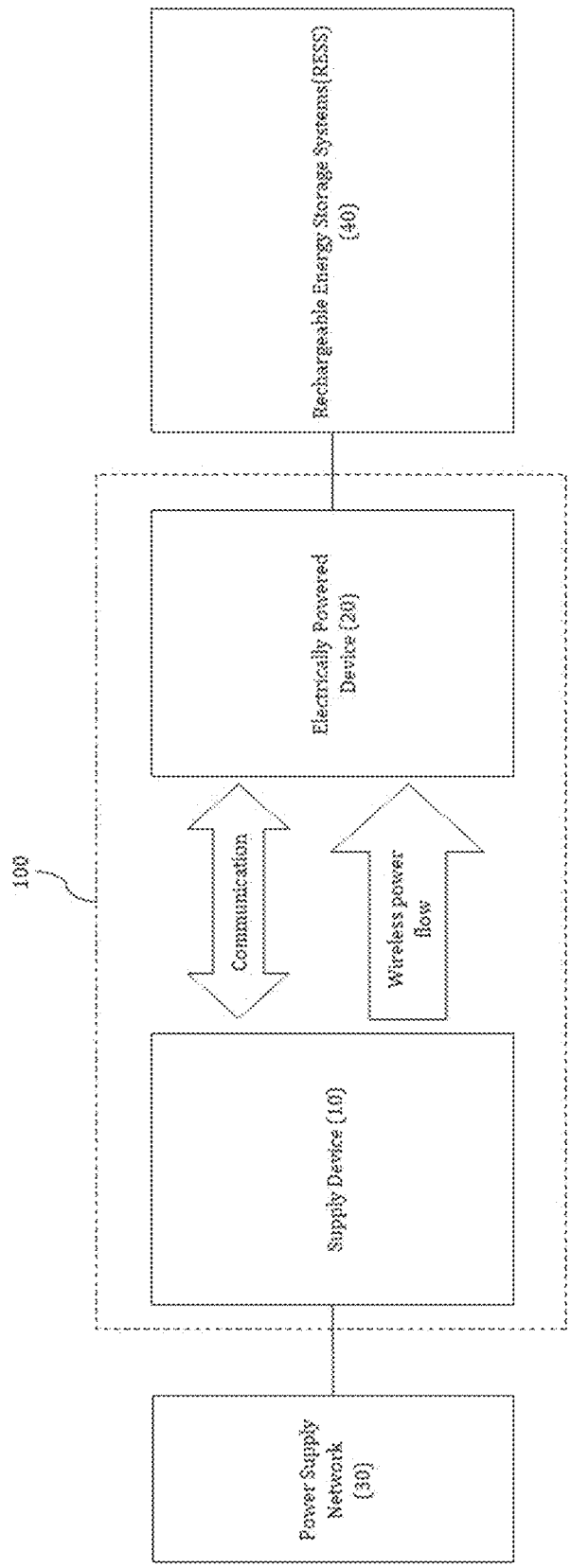
FIG. 1 is a diagram illustrating the overall structure of a wireless power transmission system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object of the present disclosure is to provide a method of configuring a longitudinal wireless charging chain by aligning electric vehicles equipped with wireless power transmission/reception pads, and an apparatus and system for the same.

Another object of the present disclosure is to provide a method of configuring a longitudinal wireless charging chain capable of charging multiple electric vehicles with one wireless power supply device.

Another object of the present disclosure is to provide a cost-effective wireless charging system for electric vehicles.

Another object of the present disclosure is to provide a wireless charging system for electric vehicles that is easy to maintain.

Another object of the present disclosure is to provide a wireless charging system capable of wirelessly charging multiple electric vehicles through one supply device while the electric vehicles are temporarily stopped or parked at an intersection, thereby effectively addressing issues related to the capacity and weight of batteries of the electric vehicles and efficiently reducing the initial cost of investment in facilities.

Multiple electric vehicles may be wirelessly charged through one supply device in the form of a longitudinal chain while the electric vehicles are temporarily stopped or parked at an intersection. Accordingly, issues related to the capacity and weight of batteries of the electric vehicles may be effectively addressed and the initial cost of investment in facilities may be efficiently reduced.

Hereinafter, embodiments of the present disclosure will be described in detail with reference to FIGS. 1 to 10.

FIG. 1 is a diagram illustrating the overall structure of a wireless power transmission system according to an embodiment.

Referring to FIG. 1, a wireless power transmission system 100 may include a supply device 10 and an electric vehicle (EV) device 20.

The supply device 10 may convert AC (or DC) electrical energy supplied from a power supply network 30 into AC electrical energy required by the EV charging device 20, and then transmit the converted AC electrical energy to the EV charging device 20 using a predetermined wireless energy transmission method.

The supply device 10 and the EV charging device 20 may be wirelessly connected to exchange various kinds of information for wireless power transmission.

The EV charging device 20 may rectify the wireless power received from the supply device 10 and then supply the power to in-vehicle, that is, on-board rechargeable energy storage systems (RESS) to charge the battery for driving the vehicle.

The supply device 10 according to the embodiment may be buried in/installed on a road, a parking lot, etc., but this is merely one embodiment. The supply device 10 may be installed on a wall or configured in the air.

The EV charging device 20 may be mounted on one side of a lower part of the vehicle. However, this is merely one embodiment. The electrically powered device may be mounted on one side of the front/rear bumper of the vehicle, one side of the left/right rear mirror of the vehicle, or one side of an upper part of the vehicle according to the design by those skilled in the art.

The supply device 10 according to the embodiment may be operatively connected to other supply devices by a wired or wireless communication system.

The EV charging device 20 according to the embodiment may be operatively connected to another EV charging device by a wireless communication system. To this end, the EV charging device 20 may be connected to a vehicle terminal (not shown) over an in-vehicle communication network. For example, the wireless communication system may be a multiple access system that supports communication with multiple users by sharing an available system resource (e.g., bandwidth, transmit power, etc.). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

The EV charging device 20 according to the embodiment may be connected to another supply device by wireless communication. As an example, the EV charging device 20 may be connected to multiple supply devices 10. In this case, the EV charging device 20 may receive wireless power from the supply devices 10 simultaneously. Based on the wireless charging efficiency between the EV charging device 20 and the supply devices 10, the EV charging device 20 may dynamically determine at least one supply device 10 to receive power.

The EV charging device 20 according to the embodiment may serve as a power relay to transmit power received from the supply device 10 to another EV charging device. In this case, the EV charging device 20 may include a wireless power receiver configured to receive wireless power and a wireless power transmitter configured to transmit wireless power. The wireless power receiver and the wireless power transmitter may be mounted at different positions in the vehicle, but this is merely one embodiment. The wireless power receiver and wireless power transmitter may be configured as one module and mounted. As an example, a wireless power receiver to receive power from the supply device 10 may be disposed on one side of the lower part of the vehicle, and a wireless power receiver to receive power from a wireless power transmitter of another vehicle may be disposed at the center of the front bumper of the vehicle. Also, a wireless power transmitter to wirelessly transmit power to another vehicle may be disposed at the center of the rear bumper of the vehicle. As another example, an integrated module implemented to enable wireless power transmission and reception (hereinafter, referred to as an "integrated transceiver" for simplicity) may be disposed on one side of a side mirror of the vehicle, and a wireless power receiver to receive power from the supply device 10 may be disposed on one side of the lower part (or upper part) of the vehicle. As another example, a wireless power receiver to receive power from the supply device 10 may be disposed on one side of the lower part (or upper part) of the vehicle, and a wireless power receiver to receive power from another vehicle in front of the vehicle may be disposed at the center of the front bumper of the vehicle. Also, a wireless power transmitter to transmit power to another vehicle behind the vehicle may be disposed at the center of the rear bumper of the vehicle, and an integrated transceiver may be disposed on one side of the left/right side mirror of the vehicle.

According to the above-described embodiments, a vehicle equipped with the EV charging device 20 according to the present disclosure may be implemented to flexibly configure a longitudinal and/or lateral wireless charging chain.

The EV charging device 20 may control at least one switch provided in the wireless power transmitter and the wireless power receiver to turn on/off the operations of the wireless power transmitter and the wireless power receiver.

According to an embodiment, the EV charging device 20 of a first vehicle may be operatively connected to the EV charging device 20 provided in a second vehicle to divide and transmit wireless power to the second vehicle. In this case, the amount of power by which the first vehicle and the second vehicle are to be charged may be determined based on the battery charge level of each vehicle.

The EV charging device 20 according to the embodiment may determine whether power relay to another vehicle is allowed, based on the battery charge level of the RESS 40. For example, when the battery charge level (or battery output voltage) of the first vehicle is greater than or equal to a predetermined reference value, the EV charging device 20 of the first vehicle may transmit the power received from the supply device 10 to the EV charging device 20 of the second vehicle. On the other hand, when the battery charge level (or battery output voltage) of the first vehicle is less than the predetermined reference value, the EV charging device 20 of the first vehicle may control the power received from the supply device 10 not to be relayed to the EV charging device 20 of the second vehicle.

A vehicle terminal may be connected to another vehicle terminal or a base station (or a road side unit (RSU)) to exchange various kinds of information. V2X refers to a communication technology for exchanging information with other vehicles, pedestrians, and infrastructure-built objects through wired/wireless communication. V2X may be divided into four types: vehicle-to-vehicle (V2V) for vehicle-to-vehicle communication; vehicle-to-infrastructure (V2I) for communication between a vehicle and infrastructure; vehicle-to-network (V2N) for communication between a vehicle and a communication network; and vehicle-to-pedestrian (V2P) for communication between a vehicle and a pedestrian. V2X communication may be provided via a PC5 interface and/or a Uu interface.

Sidelink (SL) is a communication scheme that establishes a direct wireless link between vehicle terminals to enable direct exchange of information between the vehicle terminals without intervention of a base station (BS) or infrastructure (for example, RSU). SL is considered as a way to alleviate the burden on the BS according to the rapidly increasing amount of data traffic and to minimize the transmission delay in vehicle-to-vehicle communication.

Figure 2:
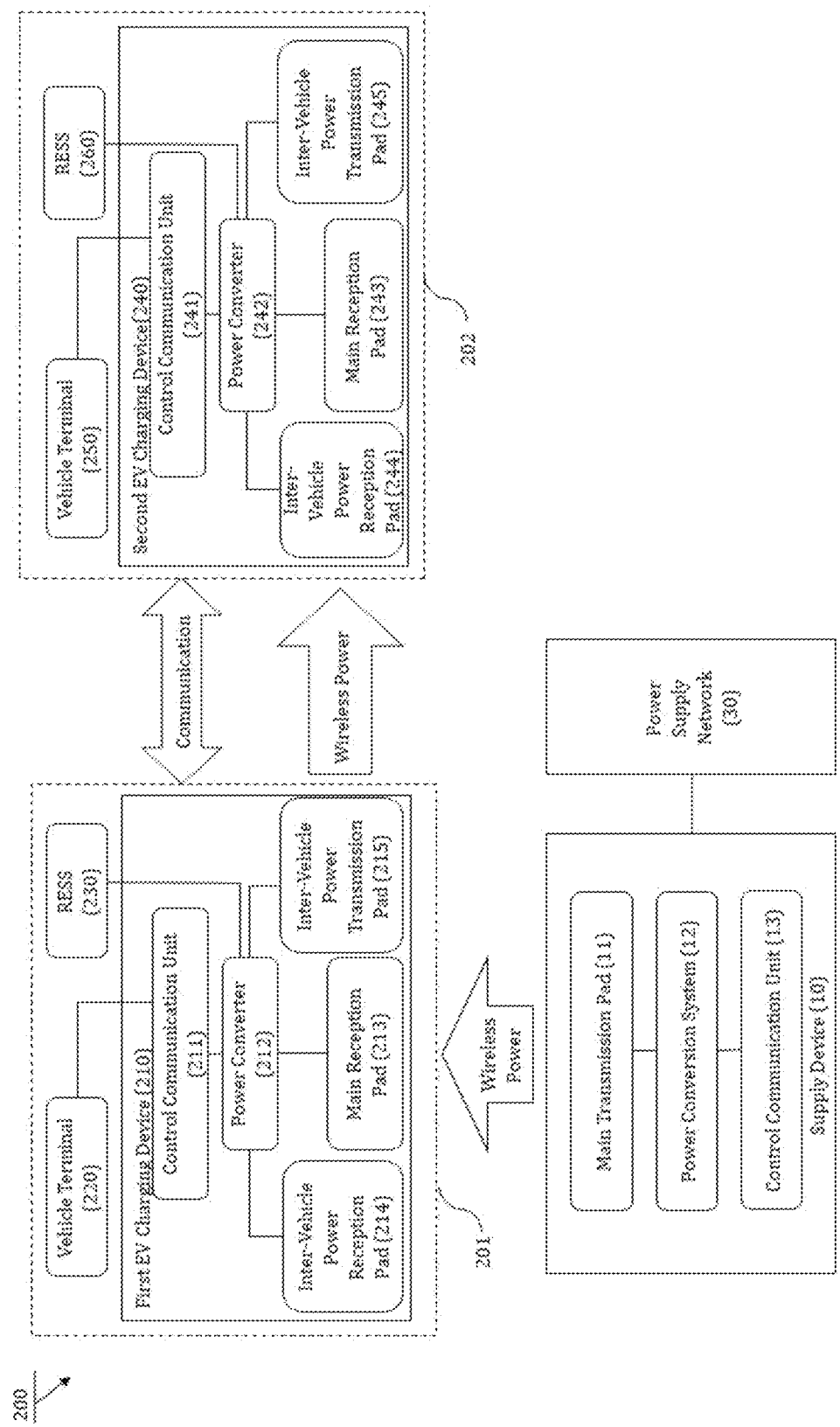
FIG. 2 is a diagram illustrating a detailed structure of an electric vehicle wireless charging system according to an embodiment.

FIG. 2 is a diagram illustrating a detailed structure of an electric vehicle wireless charging system according to an embodiment.

Specifically, FIG. 2 illustrates a detailed structure of an electric vehicle wireless charging system for providing a longitudinal wireless charging chain and a procedure of configuring a longitudinal wireless charging chain therethrough.

Referring to FIG. 2, an electric vehicle the electric vehicle wireless charging system 200 may include a supply device 10, a power supply network 30, a first electric vehicle 201, and a second electric vehicle 202. In the embodiment of FIG. 2, the configuration of a longitudinal wireless charging chain for two electric vehicles is described as an example, but this is merely one embodiment. The number of electric vehicles constituting the longitudinal wireless charging chain may be greater than or equal to 2. The maximum number of electric vehicles that can participate in the configuration of the longitudinal wireless charging chain according to one supply device 10 may be predefined or may be adaptively determined according to the battery charge level (and/or the battery output voltage) of the electric vehicles participating in the longitudinal wireless charging chain.

The first and second electric vehicles 201 and 202 may be equipped with an EV charging device 210, 240, respectively. The first electric vehicle 201 may receive wireless power from the supply device 10 via the first EV charging device 210 in a manner of electromagnetic induction. The first EV charging device 210 may transmit a portion (or entirety) of the power received from the supply device 10 to the second EV charging device 240 via the inter-vehicle wireless power transmission pad according to a request from the second EV charging device 240. As an example, the first EV charging device 210 may dynamically determine whether to transmit wireless power to the second EV charging device 240 and the magnitude and/or amount of transmitted power based on a battery charge level (or battery output voltage) of a RESS 230 of the first EV charging device 210 and a battery charge level (or battery output voltage) of a RESS 260 of the second electric vehicle 260.

Referring to FIG. 2, each of the first and second EV charging devices 210 and 240 may include a control communication unit 211, 241, a power converter 212, 242, a main reception pad 213, 243, and an inter-vehicle power reception pad 214, 244, and an inter-vehicle power transmission pad 215, 245.

The control communication units 211 and 241 may control input/output and overall operation of the corresponding EV charging devices, and may communicate with external device(s). As an example, the control communication unit 211 of the first EV charging device 210 may transmit and receive various kinds of control signals and state information to and from the control communication unit 241 of the second EV charging device 240 through in-band (or out-of-band) communication. In addition, the control communication unit 211 may exchange various kinds of control signals and state information with the vehicle terminal 220 over an in-vehicle communication network. Here, the state information transmitted between the EV charging devices may include, but is limited to, information about a battery charge level and information about a battery output voltage. In an embodiment, information about a battery charge level of each electric vehicle and information about a battery output voltage may be exchanged through communication between vehicle terminals.

The control communication unit 211 may acquire information about the current location of the second electric vehicle 202 and capability information about the second electric vehicle 202 via the vehicle terminal 220. Here, the vehicle terminal 220 of the first electric vehicle 201 may be connected to the vehicle terminal 250 of the second electric vehicle 202 through V2X communication or the like to exchange various kinds of information. Here, the capability information may include information about whether the corresponding electric vehicle is capable of inter-vehicle wireless charging. When the corresponding electric vehicle is capable of wireless charging between vehicles, the capability information may include identification information about whether the vehicle is capable of constituting a longitudinal wireless charging chain or a lateral wireless charging chain. However, embodiments are not limited thereto.

The control communication unit 211 may exchange various kinds of control signals and state information with the control communication unit 13 of the supply device 10 through in-band (or out-of-band) communication.

When the main reception pad 213 of the first electric vehicle 201 is aligned with the main transmission pad 11, the control communication unit 13 of the supply device 10 may convert the power supplied from the power supply network 30 into power required by the first electric vehicle 201. Thereafter, the converted power may be transmitted to the main reception pad of the first electric vehicle 201 via the main transmission pad 11 in a manner of electromagnetic induction.

In an embodiment, the control communication unit 13 of the supply device 10 may transmit the location information about the main transmission pad 11 (for example, lane information, a location in the lane, etc.) to a vehicle terminal (or a control communication unit) of an adjacent electric vehicle through V2X communication (or short-range wireless communication). In addition, the control communication unit 13 of the supply device 10 may provide a vehicle terminal (or control communication unit) of an adjacent electric vehicle with information about whether wireless charging is currently being performed, information about the amount of available power (and/or amount of charge), information about the types of chargeable vehicles, information about the number of electric vehicles that can be additionally charged (or information about the number of electric vehicles constituting the current longitudinal wireless charging chain), etc.

In an embodiment, detailed information about the supply device 10 including the location information about the main transmission pad 11 may be provided through a vehicle navigation system. The vehicle navigation system may periodically receive supply device update information from the server to maintain the latest information about the supply device.

When the second electric vehicle 202 approaches the first electric vehicle 201 within a predetermined distance, the control communication unit 211 may establish a short-range wireless communication connection with the second EV charging device 240. Here, the short-range wireless communication may be in-band communication using a frequency band used for wireless power transmission or out-of-band communication using a separate frequency band different from the frequency band used for wireless power transmission. As an example, the out-of-band communication may include, but is not limited to, IEEE 802.11p communication, 4G LTE communication, and 5G New Radio (NR) mmWave communication. Alternatively, Bluetooth communication, radio frequency identification (RFID) communication, near field communication (NFC), infrared (IR)-dedicated short range communications (DSRC), or optical wireless communication (OWC) may be used.

The control communication unit 211 may adaptively select a short-range communication method based on communication capability information about an adjacent electric vehicle. In this case, the capability information may include information about a communication scheme supported by the vehicle terminal.

When wireless power transmission to the second electric vehicle 202 is required, the control communication unit 211 may generate an alternating current (AC) power required by the second electric vehicle 202 through the power converter 212 and output the generated power through the inter-vehicle power transmission pad 215. The second EV charging device 240 may receive the wireless power signal transmitted by the first electric vehicle 201 through the inter-vehicle power reception pad 244. The AC power received through the inter-vehicle power reception pad 244 may be converted into power required by the RESS 260 by the power converter 242 to charge the battery.

Figure 3:
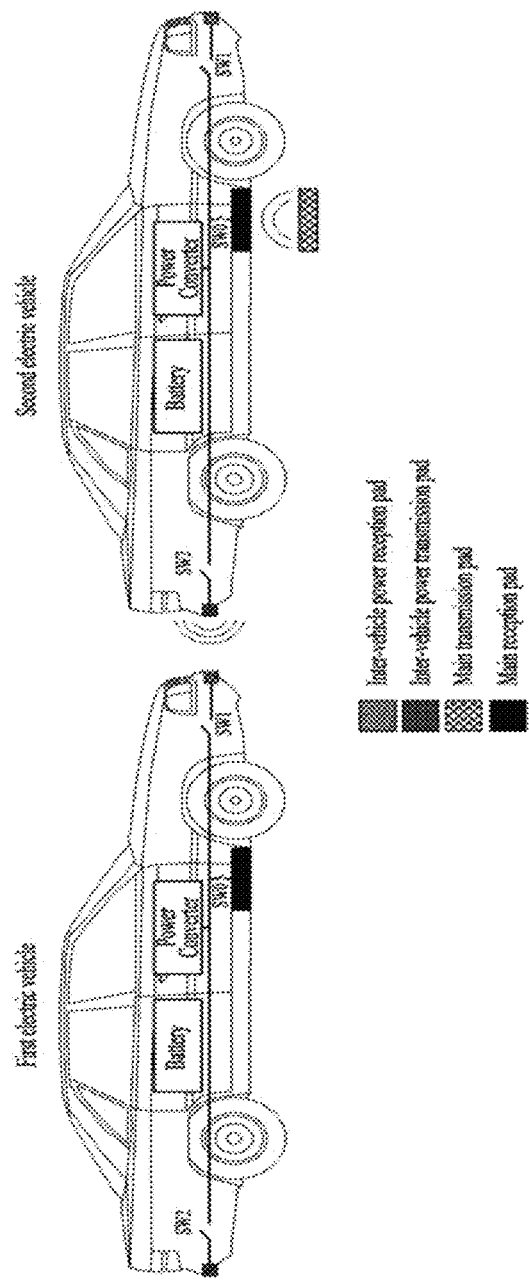
FIG. 3 is a configuration diagram of a longitudinal wireless charging chain according to an embodiment.

FIG. 3 is a configuration diagram of a longitudinal wireless charging chain according to an embodiment.

The method of configuring a longitudinal wireless charging chain according to the present disclosure may be provided as an alternative to solve the insufficient supply of wireless charging facilities for electric vehicles.

Referring to FIG. 3, when the first electric vehicle detects the main reception pad of the supply device disposed on the road surface, it may close a first switch SW0 to align the main transmission pad and the main reception pad. When the alignment of the main transmission and reception pads is completed, the supply device may determine the amount of transmission power (or magnitude of the transmitted power) through negotiation for power with the first electric vehicle, perform AC power conversion according to the determined amount of power (or magnitude of the transmitted power), and transmit wireless power.

The first electric vehicle may charge the battery thereof by converting the power received via the main reception pad into power required by the battery.

When the second electric vehicle approaches the rear of the first electric vehicle that is being charged, the second electric vehicle may align the inter-vehicle power transmission pad of the first electric vehicle with the inter-vehicle power reception pad of the second electric vehicle using various sensors provided therein. That is, the first electric vehicle and the second electric vehicle may configure a longitudinal wireless charging chain through vehicle alignment.

When the inter-vehicle power transmission pad of the first electric vehicle and the inter-vehicle power reception pad of the second electric vehicle are aligned, the first electric vehicle may close a second switch SW2 to control the power required by the second electric vehicle to be transmitted to the inter-vehicle power reception pad of the second electric vehicle via the inter-vehicle power transmission pad of the first electric vehicle.

At this time, the power converter of the first electric vehicle may distribute the wireless power received from the supply device based on the battery charge level (or battery output voltage) thereof, and then perform the operation of charging the battery thereof and the operation of supplying power to the second electric vehicle simultaneously using the distributed power.

Of course, the first electric vehicle may cut off relayed supply of the wireless power to the second electric vehicle based on the charge level of the battery thereof and/or the charge level of the battery of the second electric vehicle.

After configuring the longitudinal wireless power transmission chain, the first electric vehicle may provide the supply device (or a specific charge bill server) with information about the amount of wireless power provided to the second electric vehicle. Here, the information provided to the supply device may be used to charge fees for the first electric vehicle and the second electric vehicle.

Figure 4:
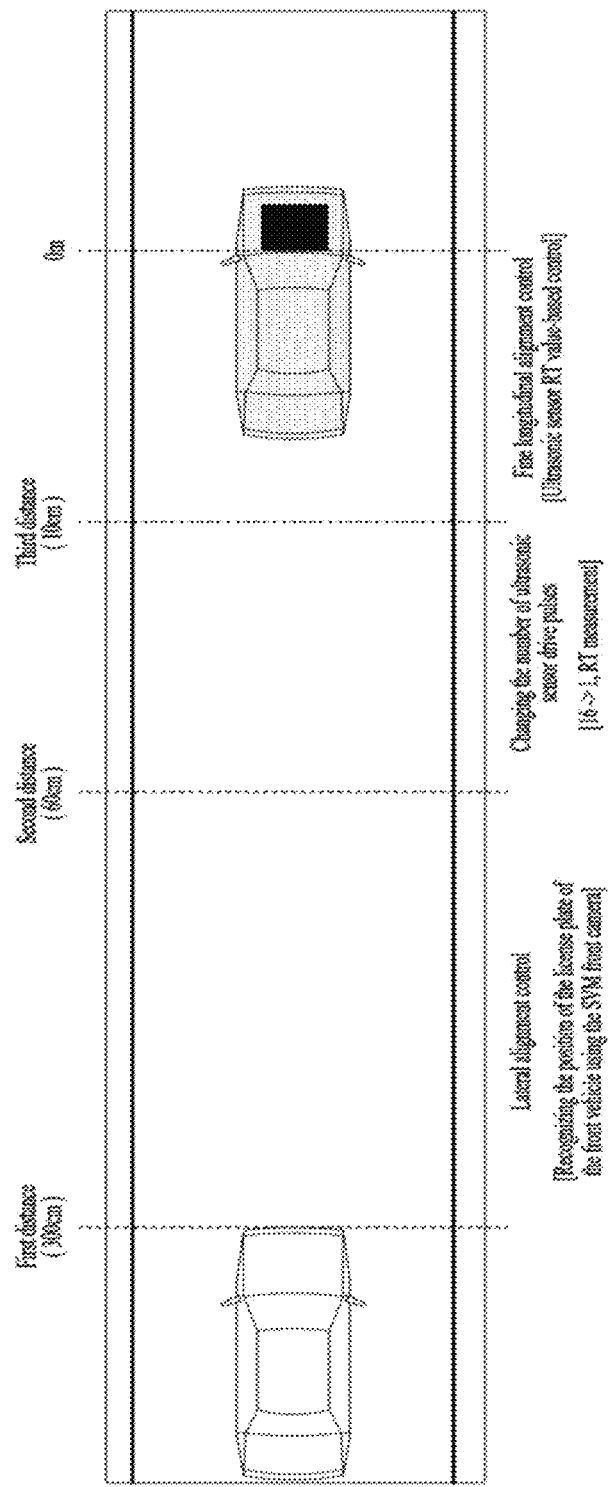
FIG. 4 illustrates a method of aligning, by electric vehicles, inter-vehicle wireless power transmission/reception pads to configure a longitudinal charging chain in according to an embodiment.

FIG. 4 illustrates a method of aligning, by electric vehicles, inter-vehicle wireless power transmission/reception pads to configure a longitudinal charging chain in according to an embodiment.

In order to increase the power transmission/reception efficiency of the wireless charging chain, the inter-vehicle wireless power transmission/reception pads should be aligned within a specific distance.

When the distance to the first vehicle that is being stopped is within a first distance, the second vehicle that is traveling may classify pixels of an image from a surround view monitor (SVM) front camera into objects using a predetermined image processing technique. For example, the image captured by the SVM front camera may be input to a deep learning-based semantic segmentation network, such that the pixels may be classified into objects. Here, the objects may include a vehicle, a road, a road bump, and a license plate. As an example, the first distance may be set to 3 meters, but this is merely one embodiment. The first distance may be adaptively set based on the travel speed of the vehicle, weather, temperature, time zone, illuminance, and the like.

The object classification according to the embodiment may be performed by inputting data acquired through data fusion (sensor fusion) between the SVM camera and the radar to the deep learning-based semantic segmentation network.

The SVM camera may be mounted on the front/rear/left side/right side of the vehicle to provide a wide view (by the front camera), a front top view (by the front/left/right cameras), a left side view (by the left camera), a right side view (by the right camera), a rear view (by the rear camera), or the like.

In general, the SVM front camera and the license plate of the vehicle are mounted at the center of the vehicle, respectively. Accordingly, when the lateral average of the pixel positions of the license plate of the vehicle in the front is equal to ½ of the lateral resolution of the image captured by the SVM front camera, it may be determined that the two vehicles are laterally aligned.

When the lateral average of the license plate pixel position is less than ½ of the lateral resolution of the image captured by the SVM front camera, the driver of the second vehicle may control the steering device to move the second vehicle to the left. When the lateral average is greater than ½ of the lateral resolution, the driver may move the second vehicle to the right. Thereby, lateral alignment may be attempted.

When the distance to the vehicle in the front is within a second distance after the lateral alignment, the second vehicle may change the number of ultrasonic sensor drive pulses and measure a ringing time (RT) to start longitudinal alignment. As an example, the number of ultrasonic sensor drive pulses per unit time may be reduced to improve performance of measurement of a short-range distance of a front obstacle. As an example, the number of ultrasonic sensor drive pulses may be reduced to $1/16$ as shown in FIG. 6, which will described later. For example, the second distance may be set to 60 cm, but this is merely one embodiment. The second distance may be adaptively set based on the travel speed of the vehicle, weather, temperature, time zone, illuminance, and the like.

After the ultrasonic sensor drive pulses are changed, when the distance to the vehicle in front is within a third distance (e.g., 10 cm), the second vehicle may perform longitudinal fine control based on the ultrasonic sensor RT value.

Figure 5:
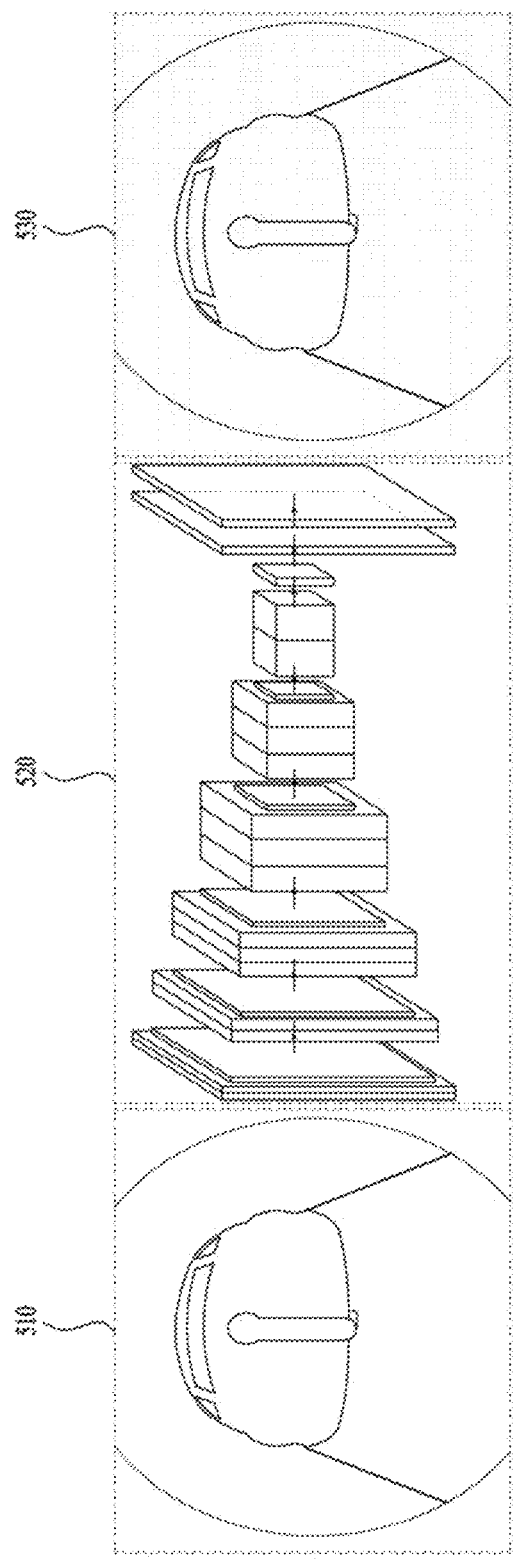
FIG. 5 illustrates a method of classifying each image pixel in an image captured by an SVM front camera according to an embodiment.

FIG. 5 illustrates a method of classifying each image pixel in an image captured by an SVM front camera according to an embodiment.

Referring to FIG. 5, an image 510 captured by the SVM front camera may be input to a deep learning-based semantic segmentation network 520. The deep learning-based semantic segmentation network 520 may output a license plate classification image 530.

FIG. 6 shows waveforms according to the number of transmission (drive) pulses of an ultrasonic sensor according to an embodiment.

RADAR, a camera, and an ultrasonic sensor, which are distance sensors used in vehicles, are difficult to accurately measure the distance to an obstacle within a short range (30 cm) or less. Since vehicle RADAR uses a frequency modulation continuous wave (FMCW), the frequency of the signal decreases as the distance to the obstacle decreases. Thus, the signal is almost a direct current (DC) within the range below 30 cm, and accordingly it is difficult to distinguish the distance below this range. In addition, in the case of the camera, as the distance to a vehicle in the front decreases, the size of the vehicle becomes larger than the size of the corresponding image, and thus the proximity performance is lowered. Even a general vehicle ultrasonic sensor may fail to accurately identify the location of an obstacle at a distance below 30 cm due to the RT.

In the present disclosure, when the distance from the vehicle in the front is within 60 cm and there is only a road from the front vehicle area to the bottom of the image, that is, when there is no obstacle such as a road bump, the number of ultrasonic sensor drive pulses may be changed. A typical vehicle ultrasonic sensor increases transmission energy by using multiple pulses (16 EA) as shown in FIG. 6-(a). However, when multiple pulses are used, the RT increases in proportion to the number of pulses used, and thus the short-range detection limit distance also increases. For example, when the number of ultrasonic sensor transmission pulses is 16 EA, the RT is 1.15 ms. In this case, the short-range detection limit distance is 20 cm. The short-range detection limit distance of the ultrasonic sensor based on the RT may be calculated through Equation 1 below.

$$\text{Short-range detection limit distance } d = \frac{RT \times \text{ultrasonic speed (340 m/s)}}{2} \quad \text{[Equation 1]}$$

When there is no obstacle such as a road bump all the way up to the front vehicle in the image from the SVM camera, the method proposed according to the present disclosure reduces the number of transmission pulses of the ultrasonic sensor in order to reduce the minimum detection distance of the obstacle (front vehicle) in an energy-concentrated beam angle. When the number of transmission pulses is reduced from 16EA to 1EA, the RT is reduced to 0.5 ms as shown in FIG. 6-(b). Accordingly, the longitudinal short-range detection limit distance may be shortened to 8.5 cm. Therefore, with the proposed method, the separation distance between the transmission and reception pads for inter-vehicle wireless charging may be minimized by shortening the longitudinal distance between the vehicles as much as possible without a vehicle collision. As the distance between the inter-vehicle wireless transmission and reception pads decreases, wireless power transmission efficiency may be maximized, and thus waste of power may be minimized.

Figure 7:
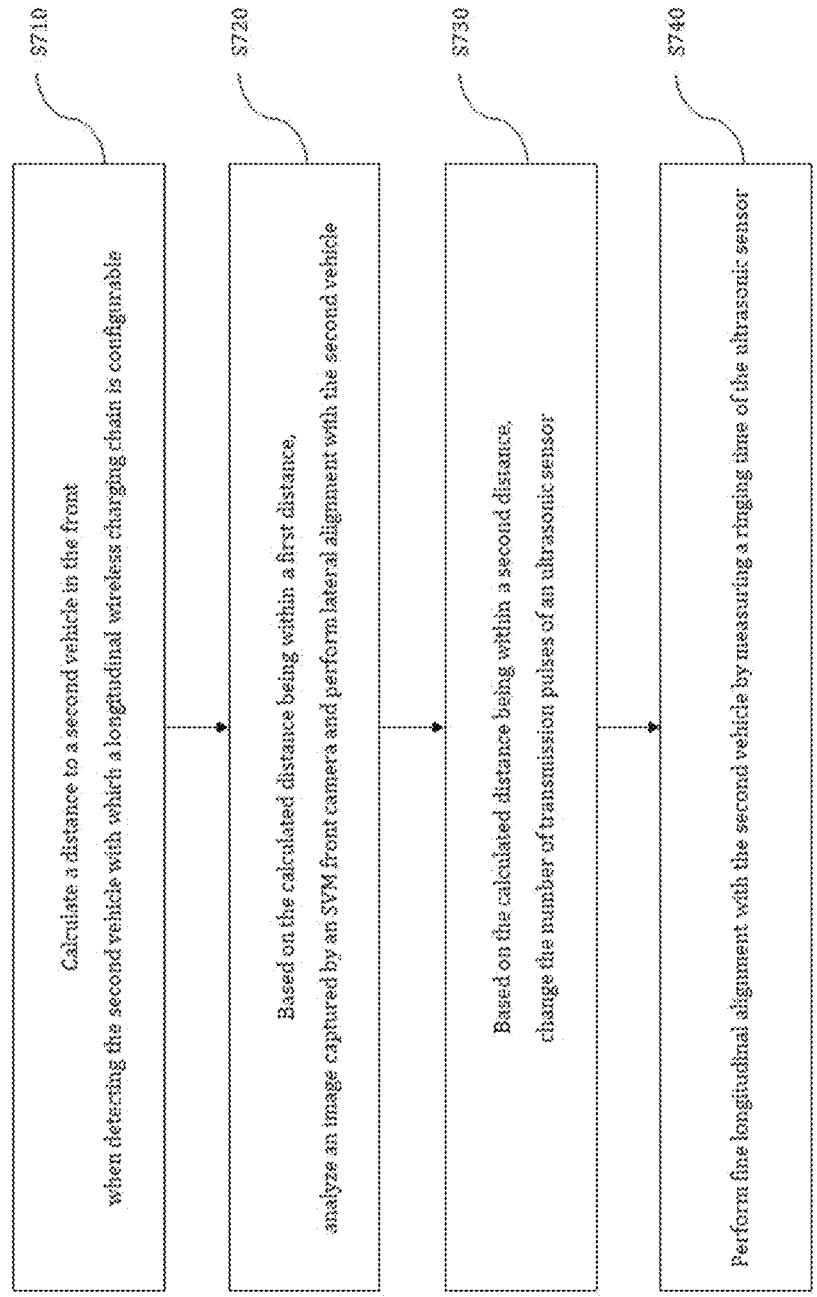
FIG. 7 is a flowchart illustrating a method of configuring a longitudinal wireless charging chain according to an embodiment.

FIG. 7 is a flowchart illustrating a method of configuring a longitudinal wireless charging chain according to an embodiment.

Referring to FIG. 7, a first vehicle that is traveling may calculate a distance to a second vehicle in the front when detecting the second vehicle with which a longitudinal wireless charging chain is configurable (S710).

Based on the calculated distance being within a first distance, the first vehicle may analyze an image captured by an SVM front camera and perform lateral alignment with the second vehicle (S720).

After the lateral alignment is completed, based on the calculated distance to the second vehicle being within a second distance, the first vehicle may change the number of transmission (drive) pulses of an ultrasonic sensor provided therein (S730). Here, the first vehicle may decrease the number of drive pulses of the ultrasonic sensor in order to reduce the short-range detection limit distance. For example, the number of transmission pulses of the ultrasonic sensor may be changed from 16 EA to 1 EA.

The first vehicle may perform fine longitudinal alignment with the second vehicle by measuring a ringing time of the ultrasonic sensor (S740). When the distance between the first vehicle and the second vehicle is within the short-range detection limit distance according to the fine longitudinal alignment, the first vehicle may stop and perform inter-vehicle longitudinal wireless charging.

Figure 8:
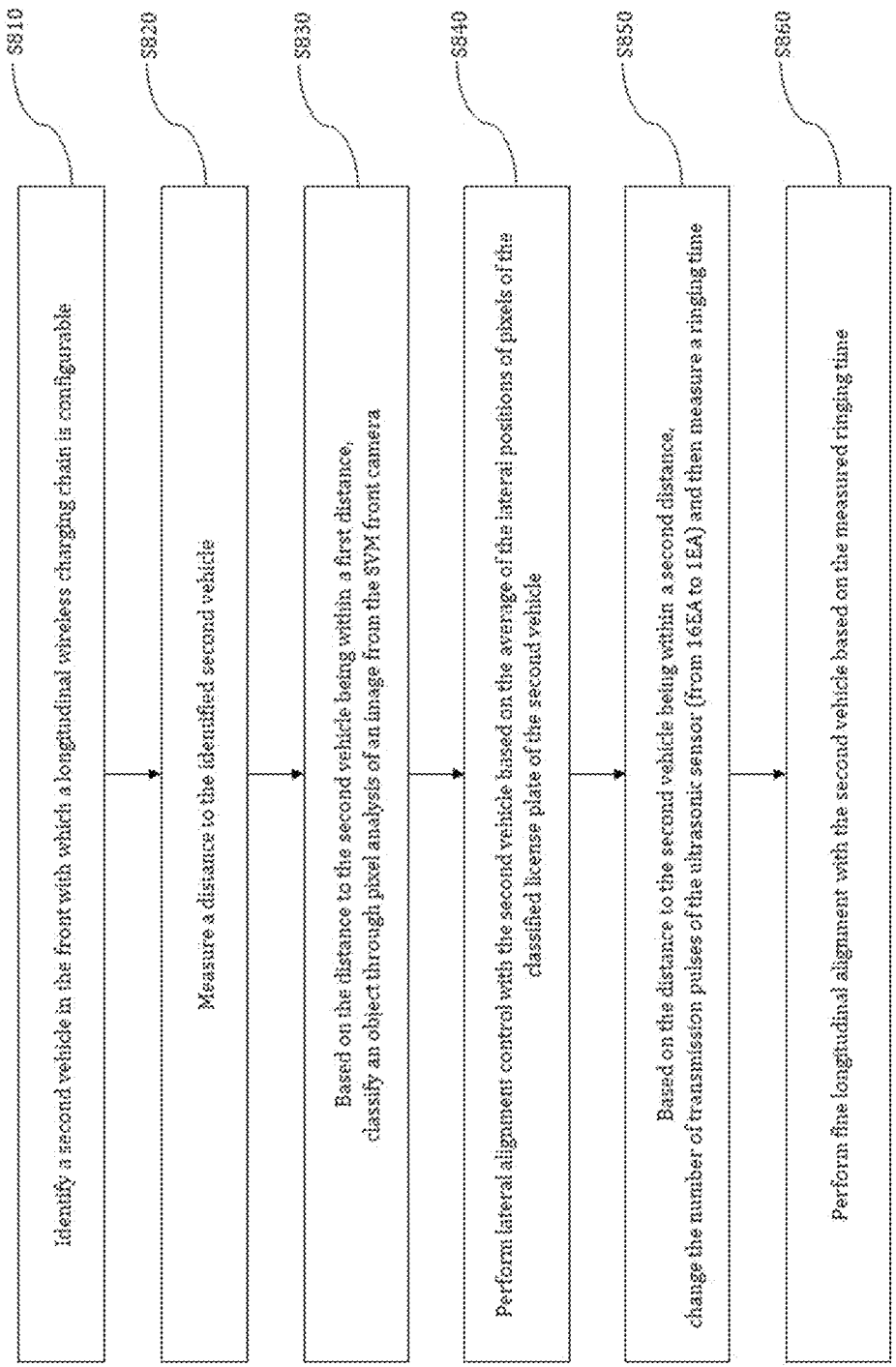
FIG. 8 is a flowchart illustrating a method of configuring a longitudinal wireless charging chain according to another embodiment.

FIG. 8 is a flowchart illustrating a method of configuring a longitudinal wireless charging chain according to another embodiment.

Referring to FIG. 8, a first vehicle may identify, through V2X communication, a second vehicle in the front with which a longitudinal wireless charging chain is configurable (S810).

The first vehicle may measure a distance to the second vehicle using a front LiDAR and an ultrasonic sensor (S820).

Based on the distance to the second vehicle being within a first distance, the first vehicle may classify an object through pixel analysis of an image from the SVM front camera (S830). Here, the classified object may include, but is not limited to, the second vehicle, a road surface, a road bump, and a license plate of the second vehicle. For example, the first distance may be set to 300 cm, but is not limited thereto. The first distance may be adaptively set based on the performance of the corresponding vehicle, travel speed, weather, temperature, time zone, and the like.

The first vehicle may perform lateral alignment control with the second vehicle based on the average of the lateral positions of pixels of the classified license plate of the second vehicle (S840). The first vehicle may output guide information for lateral alignment through a provided display, for example, a screen of a navigation system. The driver of the first vehicle may perform lateral alignment by manipulating the steering wheel according to the guide information displayed on the display. For example, when an average lateral position u of the pixels for the license plate of the second vehicle is greater than ½ of a lateral resolution of the image from the SVM camera, the first vehicle may provide a guide to control the steering wheel to the right. On the other hand, when the average lateral position u of the pixels for the license plate of the second vehicle is less than or equal to ½ of the lateral resolution of the image from the SVM camera, the first vehicle may provide a guide to control the steering wheel to the left. When the lateral alignment is completed, the first vehicle may output a predetermined notification message through a display screen (or a speaker, a vibration means, etc.) to inform the driver that the lateral alignment is completed.

Based on the distance to the second vehicle being within a second distance, the first vehicle may change the number of transmission (drive) pulses of the provided ultrasonic sensor and then measure a ringing time (S850). Here, the first vehicle may decrease the number of drive pulses of the ultrasonic sensor in order to reduce a short-range detection limit distance. As an example, the number of transmission pulses of the ultrasonic sensor may be changed from 16 EA to 1 EA, but this is merely one embodiment. The number of transmission pulses of the ultrasonic sensor may be adaptively changed based on the specifications and performance of the ultrasonic sensor and/or the maximum (or minimum or optimal) separation distance between the inter-vehicle wireless charging transmission and reception pads for configuration of a longitudinal wireless charging chain. For example, the second distance may be set to 60 cm, but this is merely one embodiment. The second distance may be adaptively set based on the performance of the corresponding vehicle, travel speed, weather, temperature, time zone, and the like.

The first vehicle may perform fine longitudinal alignment with the second vehicle based on the measured ringing time (S860). In an embodiment, based on the distance to the second vehicle being within a third distance, the first vehicle may perform fine longitudinal alignment. For example, the third distance may be set to 10 cm, but this is merely an embodiment. The third distance may be adaptively set based on the performance of the corresponding vehicle, travel speed, weather, temperature, time zone, and the like. When the distance between the first vehicle and the second vehicle is within the short-range detection limit distance according to the fine longitudinal alignment, the first vehicle may output, through a display screen (or a speaker or vibration means, etc.), a predetermined notification message informing that the inter-vehicle alignment for configuration of the longitudinal wireless charging chain is completed. Then, it may be automatically stopped.

When the distance between the first vehicle and the second vehicle is within the short-range detection limit distance according to the fine longitudinal alignment, the first vehicle may stop and perform inter-vehicle longitudinal wireless charging. That is, the first vehicle may charge the battery by wireless power from the second vehicle.

FIG. 9 is a block diagram illustrating a configuration of an electric vehicle according to an embodiment.

Referring to FIG. 9, an electric vehicle 900 may include a vehicle sensor 910, a battery 920, a vehicle terminal 930, an output device 940, an electric control unit (ECU) 950, a memory 960, and an EV charging device 970.

The vehicle sensor 910 may include, but is not limited to, a camera 911, a LiDAR 912, and an ultrasonic sensor 913. It may further include a smart parking assistance system (SPAS) sensor and a radar. According to an embodiment, the camera 911 may include an SVM camera. The SVM camera may include a front camera, a left/right side camera, and a rear camera.

The vehicle sensor 910, the vehicle terminal 930, the output device 940, and the ECU 950 may be connected to the EV charging device 970 over an in-vehicle communication network. Here, the in-vehicle communication network may include, but is not limited to, a controller area network (CAN), a local interconnect network (LIN), a FlexRay, and a media oriented systems transport (MOST) communication network.

The EV charging device 970 may detect another vehicle in the front with which a longitudinal wireless charging chain is configurable during driving. The EV charging device 970 may collect various kinds of information about other nearby vehicles through V2X communication using the vehicle terminal 930, and identify the other vehicle with which the longitudinal wireless charging chain is configurable based on the collected information. An example, the information collected from the other vehicle may include, but is not limited to, information about the current location of the vehicle, information about the vehicle type, information about whether a longitudinal wireless charging chain is configurable, information about whether wireless charging is being performed, and information about a battery charge level.

The EV charging device 970 may calculate a distance to the other vehicle with which the longitudinal wireless charging chain is configurable. As an example, the EV charging device 970 may calculate the distance to the other vehicle in operative connection with at least one of the ultrasonic sensor 912 and the LiDAR 912

Based on the calculated distance being within a first distance, the EV charging device 970 may perform lateral alignment with the other vehicle.

For example, the EV charging device 970 may classify an object through pixel analysis of an image captured by the camera 911, calculate an average lateral position of pixels corresponding to a specific classified object, and perform lateral steering control by comparing the average lateral position with ½ of the lateral pixels of the image captured by the camera 911. Here, the specific object may be a license plate of the other vehicle, but this is merely one embodiment. The specific object may be dynamically determined according to a vehicle type of the other vehicle.

As an example, the EV charging device 970 may be operatively connected to a steering system over an in-vehicle communication network for lateral steering control. Based on the average lateral position being greater than ½ of the lateral pixels of the image captured by the camera 911, the EV charging device 970 may transmit a predetermined control command to the steering system such that the vehicle thereof moves to the right side with respect to the travel direction. Based on the average lateral position being less than or equal to ½ of the lateral pixels of the image captured by the camera 911, the EV charging device 970 may transmit a predetermined control command to move the vehicle there to the left side with respect to the travel direction.

When the distance to the other vehicle is within a second distance after the lateral steering control is completed, the EV charging device 970 may perform longitudinal steering control.

As an example, the EV charging device 970 may perform longitudinal steering control in operative connection with the ultrasonic sensor 913.

When the distance to the other vehicle is within the second distance, the EV charging device 970 may decrease or change the number of ultrasonic sensor drive pulses and set a short-range detection limit distance corresponding to the decreased number of ultrasonic sensor drive pulses.

The EV charging device 970 may measure a ringing time during longitudinal steering control, and perform fine longitudinal alignment up to the short-range detection limit distance based on the measured ringing time. When the vehicle reaches the short-range detection limit distance, the EV charging device 970 may output a predetermined notification message indicating that the vehicle alignment for configuring the longitudinal wireless charging chain is completed through the output device 940 and then perform a control operation to stop the vehicle After the vehicle is stopped, the EV charging device 970 may receive wireless power from the other vehicle and charge the battery 920.

As an example, the EV charging device 970 may change the number of ultrasonic sensor drive pulses to 1 for longitudinal steering control.

When only a road is present in between the front vehicle area and the bottom of the image captured by the camera, the EV charging device 970 may change the number of ultrasonic sensor drive pulses to 1 for longitudinal steering control.

In the above embodiment, it has been described that the traveling vehicle classifies objects through analysis of an image captured by SVM camera, and performs lateral alignment with the front vehicle based on the average lateral position of the license plate of the front vehicle among the classified objects. However, this is merely one embodiment. An object serving as a reference for lateral alignment may vary depending on the type of the front vehicle. For example, a specific object serving as a reference for lateral alignment may be set as a trunk key box, a vehicle emblem, a rear tire, a trunk, a rear bumper, or the like.

The EV charging device described in relation to the embodiments disclosed in the present disclosure may include at least one transceiver configured to transmit and receive signals to and from a vehicle display, a vehicle terminal and various ECUs connected over the in-vehicle communication network, external network equipment connected over an external wired/wireless communication network, and an EV charging device of another vehicle, and a user device, at least one processor connected to the at least one transceiver to control the overall operation, and a memory having a program recorded thereon for an operation of the at least one processor.

The supply device described in relation to the embodiments disclosed in the present disclosure may include a first transceiver configured to transmit and receive signals to and from the EV charging device through in-band (or out-of-band) communication, and receives power from the power supply network, a second transceiver configured to receive power from a power supply network and transmit and receive various kinds of control signals to and from the power supply network, at least one processor connected to the first and second transceivers to control the overall operation, and a memory having a program recorded thereon for the operation of the processor.

Steps in a method or algorithm described in relation to the embodiments disclosed herein may be directly implemented in hardware, a software module, or a combination of the two, executed by a processor. The software module may reside in a storage medium (i.e., a memory and/or storage) such as a RAM, a flash memory, a ROM, an EPROM, an EEPROM, a register, a hard disk, a removable disk, or a CD-ROM.

A storage medium may be coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments. The scope of the present disclosure should be construed by the appended claims, and all technical ideas within the scope equivalent thereto should be construed as being within the scope of the present disclosure.

What is claimed is:

1. A method of configuring a longitudinal wireless charging chain by a first vehicle, the method comprising:
    detecting a second vehicle in which a longitudinal wireless charging chain is configurable;
    calculating a distance to the second vehicle;
    performing, based on the calculated distance being within a first distance, lateral alignment with the second vehicle;
    performing, based on the calculated distance being within a second distance, longitudinal alignment with the second vehicle by decreasing a number of drive pulses of an ultrasonic sensor to reduce a short-range detection limit distance and measuring a ringing time of the ultrasonic sensor; and
    performing, based on the calculated distance being within a third distance, fine longitudinal alignment with the second vehicle up to the short-range detection limit distance based on the measured ringing time.

2. The method of claim 1, wherein the first distance is greater than the second distance, which is greater than the third distance,
    wherein when the calculated distance is within the short-range detection limit distance according to the fine longitudinal alignment, the first vehicle completes inter-vehicle alignments for configuration of the longitudinal wireless charging chain and performs inter-vehicle longitudinal wireless charging, and
    wherein the distance to the second vehicle is calculated using either one or both of the ultrasonic sensor and a Light Detection and Ranging (LiDAR) provided in the first vehicle.

3. The method of claim 1, wherein the second vehicle is detected through Vehicle to Everything (V2X) communication.

4. The method of claim 1, wherein the performing of the lateral alignment with the second vehicle comprises:
    classifying objects through pixel analysis of an image captured by a camera;
    calculating an average lateral position of pixels corresponding to a classified specific object of the classified objects; and
    performing lateral steering control by comparing the average lateral position with ½ of lateral pixels of the image.

5. The method of claim 4, wherein the classified specific object is a license plate of the second vehicle.

6. The method of claim 4, wherein the classified specific object is dynamically determined based on a vehicle type of the second vehicle.

7. The method of claim 4, wherein the camera is a surround view monitor (SVM) front camera.

8. The method of claim 4, wherein the performing of the lateral alignment comprises:
    performing, based on the average lateral position being greater than ½ of the lateral pixels of the image, steering control of the first vehicle to a first direction; and
    performing, based on the average lateral position being less than or equal to ½ of the lateral pixels of the image, steering control of the first vehicle to a second direction different from the first direction.

9. The method of claim 1, wherein the performing of the longitudinal alignment further comprises setting the short-range detection limit distance corresponding to the decreased number of the drive pulses of the ultrasonic sensor.

10. The method of claim 9, wherein the number of drive pulses of the ultrasonic sensor is decreased to 1.

11. A non-transitory computer-readable storage medium storing instructions that, when executed by one or more processors, configure the one or more processors to perform operations for configuring a longitudinal wireless charging chain by a vehicle operatively connected to another vehicle over a communication network, the operations comprising:
    detecting the other vehicle in which the longitudinal wireless charging chain is configurable;
    calculating a distance to the other vehicle;
    performing, based on the calculated distance being within a first distance, lateral alignment with the other vehicle;
    performing, based on the calculated distance being within a second distance, longitudinal alignment with the other vehicle by decreasing a number of drive pulses of an ultrasonic sensor to reduce a short-range detection limit distance and measuring a ringing time of the ultrasonic sensor; and
    performing, based on the calculated distance being within a third distance, fine longitudinal alignment with the other vehicle up to the short-range detection limit distance based on the measured ringing time.

12. An electric vehicle configured for wireless charging, the electric vehicle comprising:
    a vehicle terminal configured to communicate with the other another-vehicle;

a vehicle sensor comprising a camera, a Light Detection and Ranging (LiDAR), and an ultrasonic sensor; and
an electric vehicle (EV) charging device configured to:
detect, in operative connection with the vehicle terminal, the other vehicle in which longitudinal wireless charging chain is configurable;
calculate a distance to the other vehicle in operative connection with the vehicle sensor; and
perform lateral alignment and longitudinal alignment with the other vehicle based on the calculated distance,
wherein the EV charging device is further configured to:
perform, based on the calculated distance being within a first distance, the lateral alignment with the other vehicle;
perform, based on the calculated distance being within a second distance, the longitudinal alignment with the other vehicle by decreasing a number of drive pulses of the ultrasonic sensor to reduce a short-range detection limit distance and measuring a ringing time of the ultrasonic sensor; and
performing, based on the calculated distance being within a third distance, fine longitudinal alignment with the other vehicle up to the short-range detection limit distance based on the measured ringing time.

13. The electric vehicle of claim 12, wherein the first distance is greater than the second distance, which is greater than the third distance.

14. The electric vehicle of claim 12, wherein the distance to the other vehicle is calculated using either one or both of the ultrasonic sensor and the LiDAR, and
wherein the camera comprises a surround view monitor (SVM) front camera.

15. The electric vehicle of claim 12, wherein the other vehicle is detected through Vehicle to Everything (V2X) communication.

16. The electric vehicle of claim 12, wherein the EV charging device is further configured to:
classify objects through pixel analysis of an image captured by the camera;
calculate an average lateral position of pixels corresponding to a classified specific object of the classified objects; and
perform lateral steering control by comparing the average lateral position with ½ of lateral pixels of the image captured by the camera.

17. The electric vehicle of claim 16, wherein the classified specific object is a license plate of the other vehicle.

18. The electric vehicle of claim 16, wherein the classified specific object is dynamically determined based on a vehicle type of the other vehicle.

19. The electric vehicle of claim 16, wherein the EV charging device is operatively connected to a steering system over an in-vehicle communication network, and
wherein the EV charging device is further configured to:
perform, based on the average lateral position being greater than ½ of the lateral pixels of the image, steering control to move the vehicle to a first direction with respect to a travel direction; and
perform, based on the average lateral position being less than or equal to ½ of the lateral pixels of the image, steering control to move the vehicle to a second direction different from the first direction with respect to the travel direction.

20. The electric vehicle of claim 12, wherein the EV charging device is further configured to set the short-range detection limit distance corresponding to the decreased number of the ultrasonic sensor drive pulses, and
wherein the EV charging device decreases the number of drive pulses of the ultrasonic sensor to 1.

\* \* \* \* \*